United States Patent
Lovett et al.

(10) Patent No.: US 7,594,080 B2
(45) Date of Patent: Sep. 22, 2009

(54) TEMPORARY STORAGE OF MEMORY LINE WHILE WAITING FOR CACHE EVICTION

(75) Inventors: Thomas D. Lovett, Portland, OR (US); Maged M. Michael, Danbury, CT (US); Robert Joersz, Portland, OR (US); Donald R. DeSota, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 1020 days.

(21) Appl. No.: 10/661,802

(22) Filed: Sep. 12, 2003

(65) Prior Publication Data

US 2005/0060383 A1    Mar. 17, 2005

(51) Int. Cl.
G06F 12/00    (2006.01)
G06F 12/08    (2006.01)

(52) U.S. Cl. .............. 711/133; 711/140; 711/159; 711/169

(58) Field of Classification Search .............. None
See application file for complete search history.

(56) References Cited

U.S. PATENT DOCUMENTS

| | | | |
|---|---|---|---|
| 5,890,219 A * | 3/1999 | Scaringella et al. | 711/162 |
| 6,223,258 B1 * | 4/2001 | Palanca et al. | 711/138 |
| 6,549,930 B1 * | 4/2003 | Chrysos et al. | 718/104 |
| 2003/0110356 A1 * | 6/2003 | Williams, III | 711/133 |

* cited by examiner

*Primary Examiner*—Tuan V Thai
*Assistant Examiner*—Midys Rojas
(74) *Attorney, Agent, or Firm*—Steven Lieske Bennett

(57) ABSTRACT

The temporary storage of a memory line to be stored in a cache while waiting for another memory line to be evicted from the cache is disclosed. A method includes evicting a first memory line currently stored in the cache and storing a second memory line not currently stored in the cache in its place. While the first memory line is being evicted, such as by first being inserted into an eviction queue, the second memory line is temporarily stored in a buffer. The buffer may be a data transfer buffer (DTB). Upon eviction of the first memory line, the second memory line is moved from the buffer into the cache.

1 Claim, 5 Drawing Sheets

TEMPORARY STORAGE OF MEMORY LINE WHILE WAITING FOR CACHE EVICTION

BACKGROUND OF THE INVENTION

1. Technical Field

This invention relates generally to transactions, such as memory requests and their responses, and more particularly to the eviction of memory lines from a cache so that the memory lines to which the transactions relate can be inserted into the cache.

2. Description of the Prior Art

There are many different types of multi-processor computer systems. A symmetric multi-processor (SMP) system includes a number of processors that share a common memory. SMP systems provide scalability. As needs dictate, additional processors can be added. SMP systems usually range from two to 32 or more processors. One processor generally boots the system and loads the SMP operating system, which brings the other processors online. Without partitioning, there is only one instance of the operating system and one instance of the application in memory. The operating system uses the processors as a pool of processing resources, all executing simultaneously, where each processor either processes data or is in an idle loop waiting to perform a task. SMP systems increase in speed whenever processes can be overlapped.

A massively parallel processor (MPP) system can use thousands or more processors. MPP systems use a different programming paradigm than the more common SMP systems. In an MPP system, each processor contains its own memory and copy of the operating system and application. Each subsystem communicates with the others through a high-speed interconnect. To use an MPP system effectively, an information-processing problem should be breakable into pieces that can be solved simultaneously. For example, in scientific environments, certain simulations and mathematical problems can be split apart and each part processed at the same time.

A non-uniform memory access (NUMA) system is a multi-processing system in which memory is separated into distinct banks. NUMA systems are similar to SMP systems. In SMP systems, however, all processors access a common memory at the same speed. By comparison, in a NUMA system, memory on the same processor board, or in the same building block, as the processor is accessed faster than memory on other processor boards, or in other building blocks. That is, local memory is accessed faster than distant shared memory. NUMA systems generally scale better to higher numbers of processors than SMP systems.

Multi-processor systems usually include one or more coherency controllers to manage memory transactions from the various processors and input/output (I/O). The coherency controllers negotiate multiple read and write requests emanating from the processors or I/O, and also negotiate the responses back to these processors or I/O. Usually, a coherency controller includes a pipeline, in which transactions, such as requests and responses, are input, and actions that can be performed relative to the memory for which the controller is responsible are output. Transaction conversion is commonly performed in a single stage of a pipeline, such that transaction conversion to performable actions is performed in one step.

For the actions to actually be performed, the memory line to which the transaction relates preferably is retrieved from either local or remote memory and placed in a cache. If the cache is already full, then another memory line must usually first be evicted. This can delay the ultimate processing of the transaction, as the eviction process can take some time. That is, the entire process is serialized, where first a given memory line is evicted, then the memory line to which a transaction relates is cached, and finally the transaction is processed. The eviction process thus usually must be completed in its entirety before the new memory line is retrieved from memory for storage in the cache, which can delay transaction processing even further.

For these and other reasons, therefore, there is a need for the present invention.

SUMMARY OF THE INVENTION

The invention relates to the temporary storage of a memory line to be stored in a cache while waiting for another memory line to be evicted from the cache. A method of the invention includes evicting a first memory line currently stored in the cache and storing a second memory line not currently stored in the cache in its place. While the first memory line is being evicted, the second memory line is temporarily stored in a buffer. Upon eviction of the first memory line, the second memory line is moved from the buffer into the cache.

A system of the invention includes a number of processors, local random-access memory (RAM) for the processors, and at least one controller to manage transactions relative to the local RAM. Each controller is able to concurrently process the transactions while memory lines to which the transactions relate are being loaded into one or more caches. This is accomplished by temporarily storing the memory lines into one or more buffers.

An article of manufacture of the invention includes a computer-readable medium and means in the medium. The means in the medium is for processing a transaction while a first memory line to which the transactions relates is being loaded into a cache by evicting a second memory line currently in the cache. The first memory line is temporarily stored into a buffer. Other features and advantages of the invention will become apparent from the following detailed description of the presently preferred embodiment of the invention, taken in conjunction with the accompanying drawings.

DESCRIPTION OF THE PREFERRED EMBODIMENT

Overview

Figure 1:
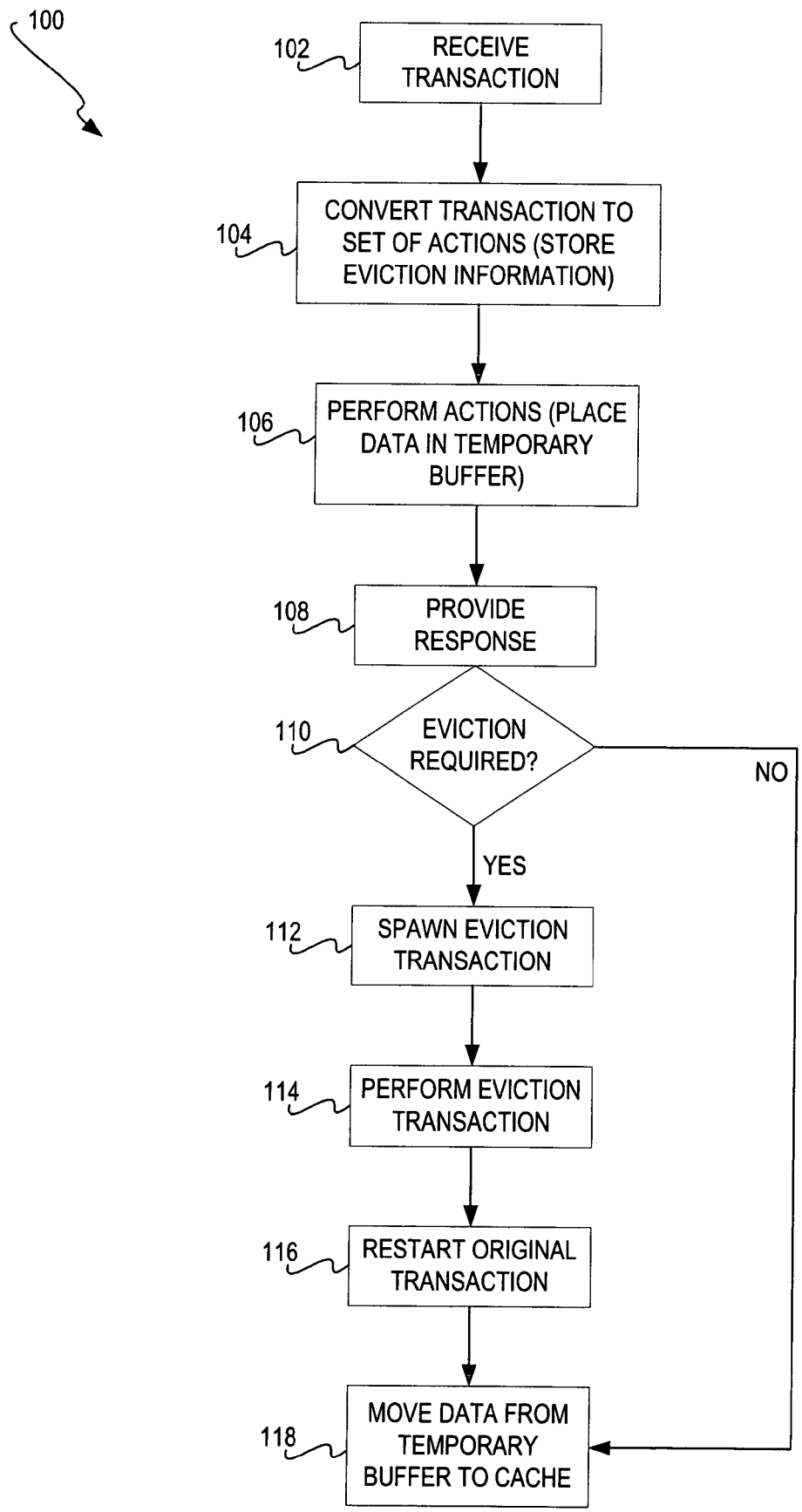
FIG. 1 is a flowchart of a method according to a preferred embodiment of the invention, and is suggested for printing on the first page of the patent.

FIG. 1 shows a method 100, according to a preferred embodiment of the invention. A transaction that includes a related memory line is received (102). The transaction may be a request to read from or write to the memory line, it may be a response to an earlier request, or it may be another type of transaction. The transaction is converted to a set of performable actions (104), which when performed effect the transaction. The conversion process may be accomplished within a multiple-stage pipeline, as will be described. Furthermore, the conversion process may entail determining whether eviction of a currently cached memory line from a cache is needed to process the transaction, such information regarding the eviction, such as the currently cached memory line that should be evicted, is stored.

For example, the method 100 may be performed by a node within a multi-node system, where each node has local memory, and the local memory of the other nodes is considered remote memory to the node performing the method 100. The memory line to which the transaction relates may reside within remote memory, and not be currently cached by the node performing the method 100, such that the node first must cache the memory line in its cache before performing the transaction. However, the cache of the node performing the method 100 may currently be full. Therefore, a currently cached memory line in the cache must be removed, or evicted, from the cache in order to make room for the memory line to which the transaction relates.

The transaction is then processed by performing the actions (106). During performance of the actions, data is stored in a temporary buffer, such as a data transfer buffer (DTB), instead of directly in the cache. Thus, even if eviction is required, the transaction can be effected, without having to wait for eviction. The buffer can in one embodiment be an existing buffer that is originally intended for a purpose other than temporary storage of data. A response is then provided indicating that the transaction has been processed (108)—that is, that the actions have been performed.

If eviction is not required (110), then the method 100 proceeds to moving the data from the temporary buffer directly to the cache (118). However, if eviction is required (100), than an eviction transaction is spawned to evict the currently cached memory line that was stored in 104. The eviction transaction is converted to a set of actions, such as within a multiple-stage pipeline, such that performance of the actions effects performance of the transaction (114). That is, the currently cached memory line is evicted. The original transaction that was received in 102 is then restarted (116), which moves the data from the temporary buffer to the cache (118).

It is noted that although the method 100 is depicted in FIG. 1 as a serial process, in alternative embodiments of the invention this does not have to be the case. That is, once it is determined in 104 that eviction of a currently cached memory line is required, the eviction transaction spawning of 112 can concurrently begin. In such instance, the original transaction may be restarted in 116 as soon as the eviction transaction has been performed in 114, and the response of 108 has been provided.

Technical Background

Figure 2:
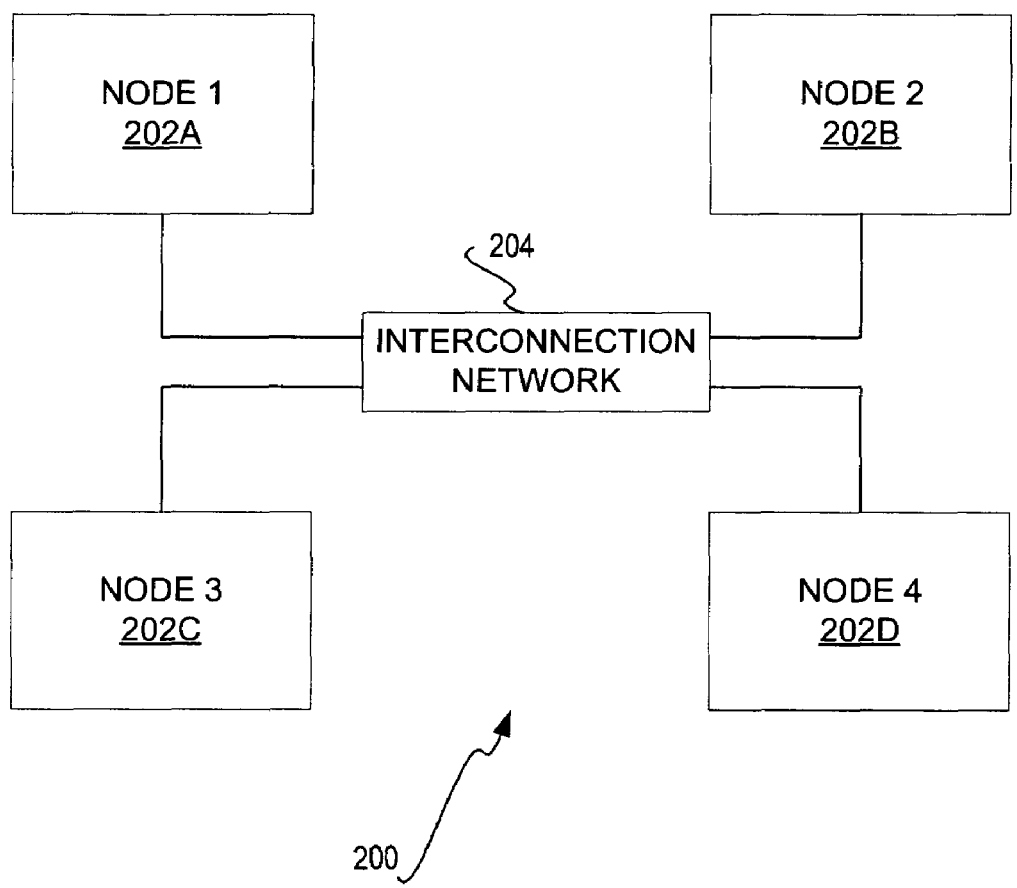
FIG. 2 is a diagram of a system having a number of multi-processor nodes, in conjunction with which embodiments of the invention may be implemented.

FIG. 2 shows a system 200 in accordance with which embodiments of the invention may be implemented. The system 200 includes a number of multiple-processor nodes 202A, 202B, 202C, and 202D, which are collectively referred to as the nodes 202. The nodes 202 are connected with one another through an interconnection network 204. Each of the nodes 202 may include a number of processors and memory. The memory of a given node is local to the processors of the node, and is remote to the processors of the other nodes. Thus, the system 200 can implement a non-uniform memory architecture (NUMA) in one embodiment of the invention.

Figure 3:
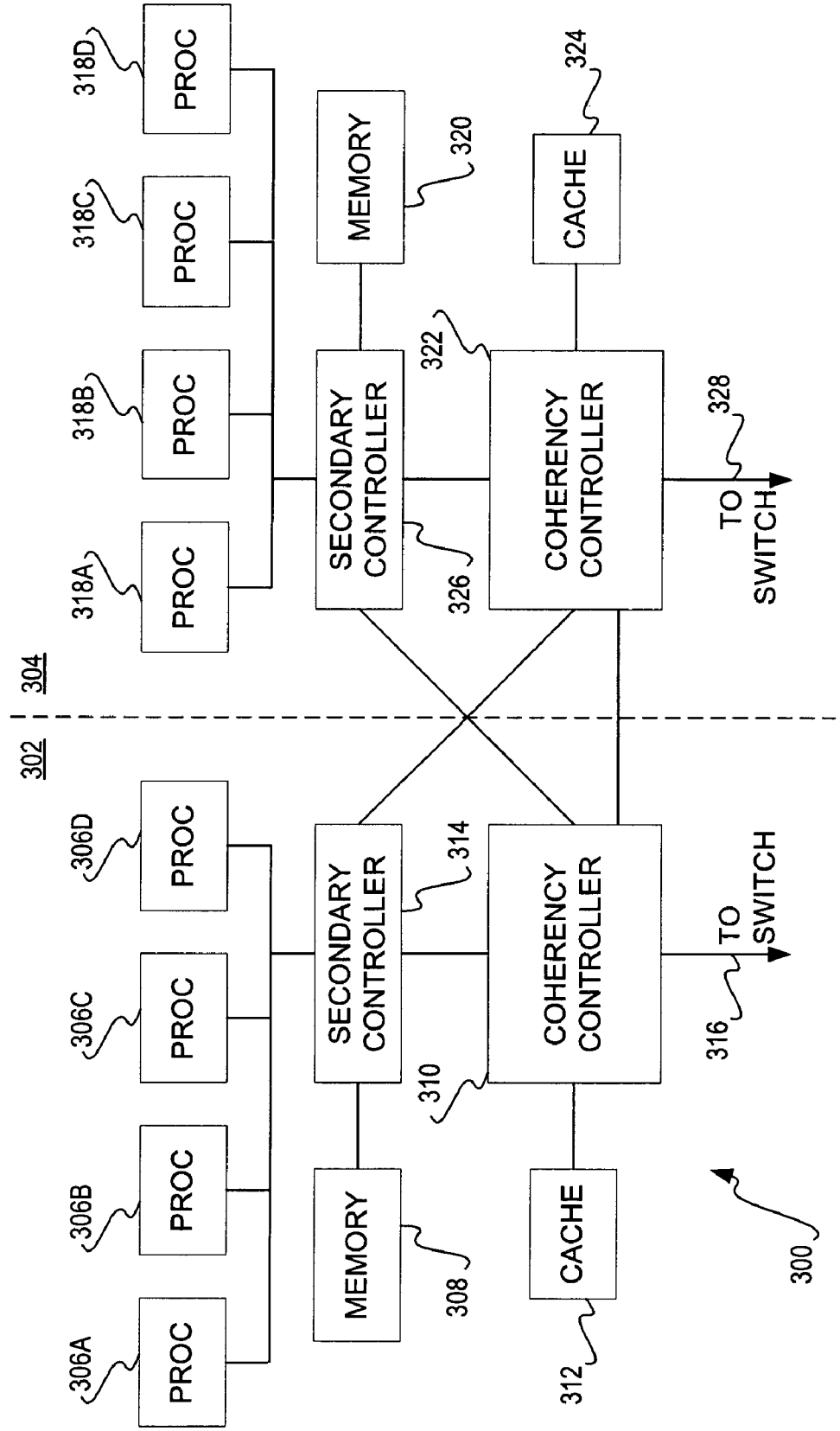
FIG. 3 is a diagram of one of the nodes of the system of FIG. 2 in more detail, according to an embodiment of the invention.

FIG. 3 shows in more detail a node 300, according to an embodiment of the invention, that can implement one or more of the nodes 202 of FIG. 2. As can be appreciated by those of ordinary skill within the art, only those components needed to implement one embodiment of the invention are shown in FIG. 3, and the node 300 may include other components as well. The node 300 is divided into a left part 302 and a right part 304. The left part 302 has four processors 306A, 306B, 306C, and 306D, collectively referred to as the processors 306, whereas the right part 304 has four processors 318A, 318B, 318C, and 318D, collectively referred to as the processors 318. Each of the parts 302 and 304 can operate as a distinct node, or quad, since each has four processors, or the parts 302 and 304 can operate together as a single node.

The left part 302 has a left memory bank 308, whereas the right part 304 has a right memory bank 320. The memory banks 308 and 320 represent a contiguous amount of random-access memory (RAM) local to the node 300 that is divided into the two banks 308 and 320. They may be divided in a number of different ways. For instance, the left bank 308 may have odd memory lines associated with it, whereas the right memory bank 320 may have the even memory lines associated with it. As another example, the left bank 308 may have the first half of the memory lines, whereas the right memory bank 320 may have the second half of the memory lines.

The left coherency controller 310 manages (memory line-related) requests to and responses from the memory bank 308, whereas the right coherency controller 322 manages requests to and responses from the memory bank 320. Each of the controllers 310 and 322 may be an application-specific integrated circuit (ASIC) in one embodiment, as well as another combination of software and hardware. To assist management of the banks 308 and 320, the controllers have caches 312 and 324, respectively. A left secondary controller 314 specifically interfaces the memory 308, the processors 306, and the coherency controller 310 with one another, and a right secondary controller 326 specifically interfaces the memory 320, the processors 318, and the coherency controller 322 with one another.

The left coherency controller 310 is able to communicate directly with the right coherency controller 322, as well as the secondary controller 326. Similarly, the right coherency controller 322 is able to communicate directly with the left coherency controller 310 as well as the secondary controller 314. Each of the coherency controllers 310 and 322 is preferably directly connected to the interconnection network that connects all the nodes, such as the interconnection network 204 of FIG. 2. This is indicated by the line 316, with respect to the coherency controller 310, and by the line 328, with respect to the coherency controller 322.

Figure 4:
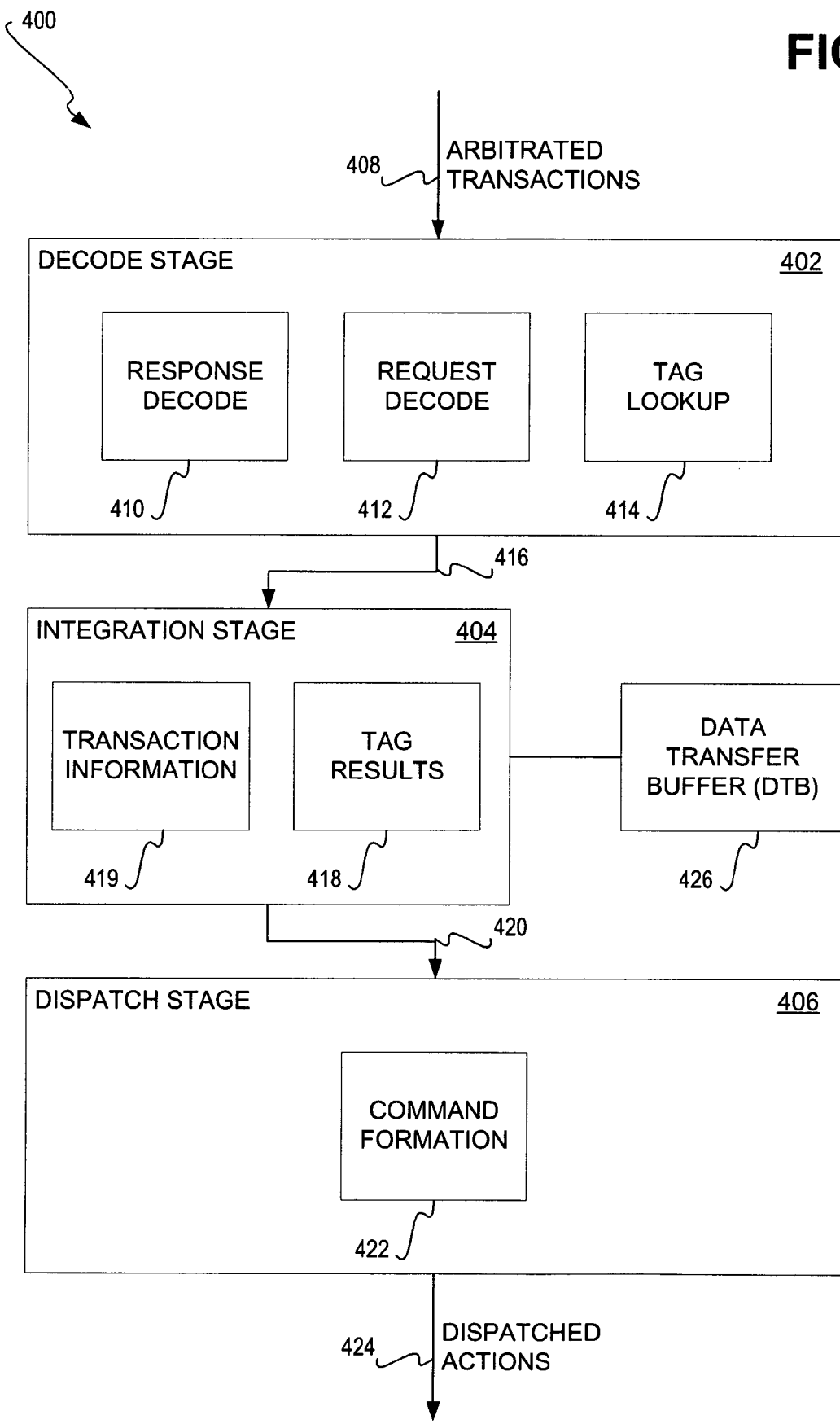
FIG. 4 is a diagram of a multiple-stage pipeline that can be implemented within each of the coherency controllers of the node of FIG. 3, to negotiate memory transactions, according to an embodiment of the invention.

FIG. 4 shows a multiple-stage pipeline 400 that may be implemented in each of the coherency controllers 310 and 322 of FIG. 3. The multiple-stage pipeline 400 includes a decode stage 402, an integration stage 404, and a dispatch stage 406. As can be appreciated by those of ordinary skill within the art, the pipeline 400 may also have additional stages other than stages 402, 404, and 406 depicted in FIG. 4. Transactions that have been arbitrated in a given order enter the decode stage 402, as indicated by the4 incoming arrow 408. The decode stage specifically includes a response decode part 410, a request decode part 412, and a tag lookup part 414. The parts 410 and 412 decode responses and requests, respectively, into internal commands, using the tag lookup part 414 to determine if the information to which they relate is stored in a cache.

The internal commands are then input into the integration stage 404, as indicated by the incoming arrow 416. The integration stage 404 specifically processes transaction information 419 of the internal commands received from the decode stage 402, and tag results 418 of the internal commands received from the decode stage 402. Thus, based on the transaction information 419 and the tag results 418, the integration stage 404 combines state information with request information and forms a commend index for use in the dispatch stage 420. The results of the integration stage 404 are then input into the dispatch stage 420. The dispatch stage 420 utilizes the results of the integration stage 404 to form the commands that when performed effect the transactions, as a command formation part 422. The resulting actions can then be dispatched, as indicated by the outgoing arrow 424, for concurrent performance thereof to effect the transaction that had initially been input into the decode stage 402.

Non-Serialized Cache Memory Line Eviction and Transaction Processing

Figure 5:
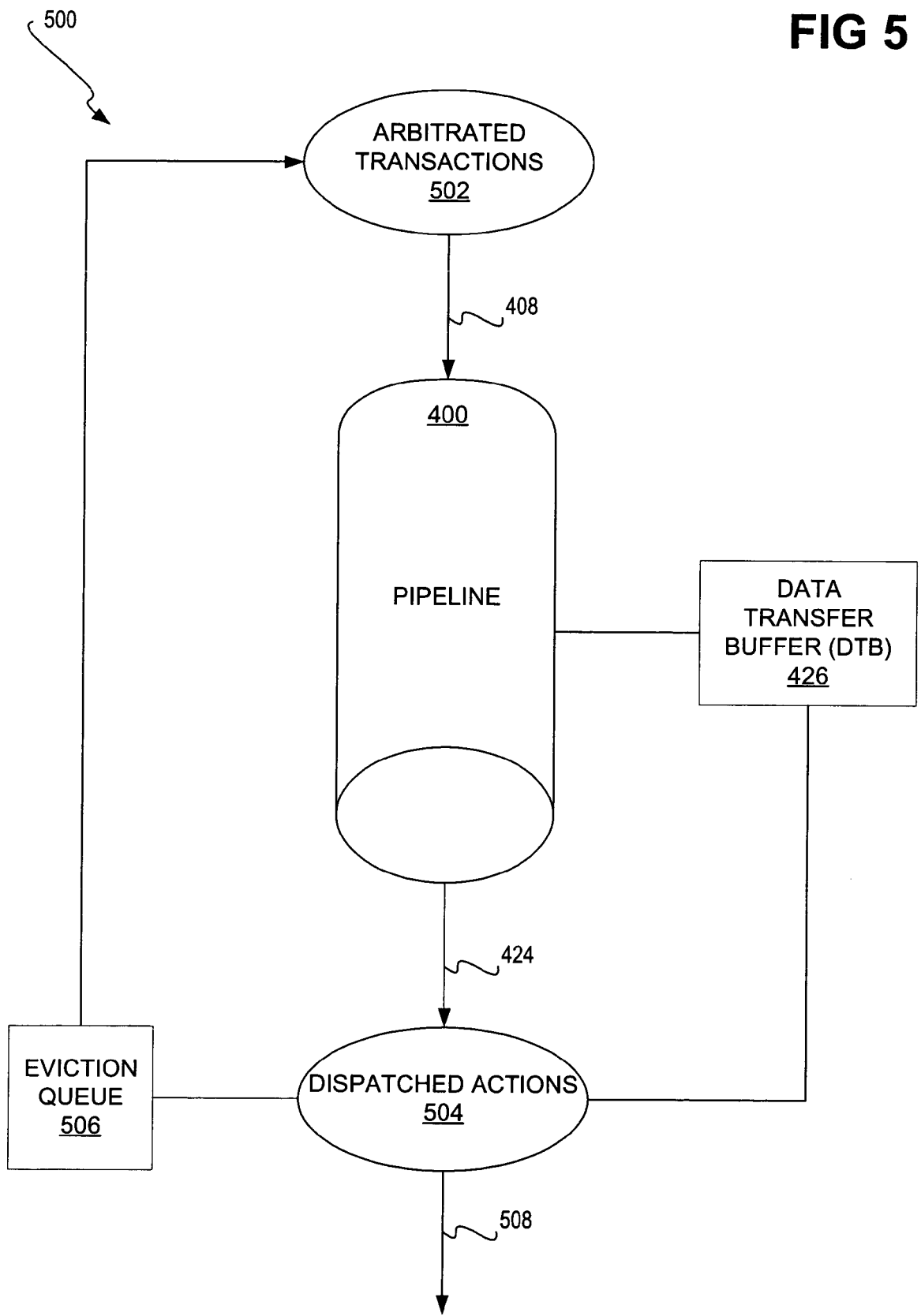
FIG. 5 is a diagram of a system that may be implemented within either or both of the coherency controllers of FIG. 3, and that provides for temporary storage of memory lines to be cached while currently cached memory lines are being evicted from the cache, according to an embodiment of the invention.

FIG. 5 shows a system 500 that may be implemented in each of the coherency controllers 310 and 322 of FIG. 3 to provide for non-serialized cache memory line eviction and transaction processing, according to an embodiment of the invention. Non-serialized cache memory line eviction and transaction processing means that the memory line to which a transaction relates does not have to wait for the eviction prior to performing the actions that effectuate the transaction. That is, transaction processing does not have to wait for a currently cached memory line to be evicted, or removed, from the cache so that the memory line to which the transaction relates can be cached.

Arbitrated transactions 502 enter the multiple-stage pipeline 400, as indicated by the arrow 408. The multiple-stage pipeline 400 converts the transactions 502 to and outputs sets of concurrently performable actions 504, as has been described, and as indicated by the arrow 424. These dispatched actions 504, when ultimately performed, as indicated by the arrow 508, effectuate the transactions 502 entering the multiple-stage pipeline 400. The pipeline 400 utilizes the data transfer buffer (DTB) 426 to temporarily hold the data due to the actions 504. Furthermore, the pipeline 400 may in the conversion process determine that a transaction requires that a currently cached memory line, such as in the cache 312 or 324 of FIG. 3, needs to be evicted to make room for a new memory line to be cached, and to which the transaction relates.

Therefore, the actions 504 for such a transaction that the pipeline 400 generates includes the temporary storage of the memory line to be cached in the DTB 426, and the eviction of the currently cached memory line by spawning an eviction transaction and placing the eviction data in the DTB 426. The actions 504 for the transaction that are then performed, as indicated by the arrow 508, utilize the version of the memory line to be cached, and to which the transaction relates, that is stored in the DTB 426. The currently cached memory line that is to be evicted and that is inserted into the eviction queue 506 ultimately routes back to the arbitrated transactions 502, so that it can be evicted by eventual input into the pipeline 400 as a new transaction of the transactions 502, as indicated by the arrow 408.

As can be appreciated by those of ordinary skill within the art, where a transaction does not require eviction of a currently cached memory line, then the dispatched actions 504 to which the transaction has been converted by the multiple-stage pipeline 400 can utilize the currently cached version of the memory line. The dispatched actions 504 in such instance do not have to utilize the DTB 426 for temporary storage of the memory line. Furthermore, the dispatched actions 504 do not include in this case an action causing the placement of a memory line in the eviction queue 506, since no eviction from the cache is needed.

Advantages over the Prior Art

Embodiments of the invention allow for advantages over the prior art. Eviction processing is not serialized relative to transaction processing. Whereas in the prior art, eviction processing must usually be performed before transaction processing is performed, embodiments of the invention allow for eviction process to be concurrently performed with, or even after performance of, transaction processing. This increases the performance of systems that require eviction processing. Furthermore, the use of an existing buffer to temporarily store memory lines to be cached, pending the eviction of other memory lines in the cache, allows for such performance benefits without increasing the resources needed by the system.

ALTERNATIVE EMBODIMENTS

It will be appreciated that, although specific embodiments of the invention have been described herein for purposes of illustration, various modifications may be made without departing from the spirit and scope of the invention. For instance, the system that has been described as amenable to implementations of embodiments of the invention has been indicated as having a non-uniform memory access (NUMA) architecture. However, the invention is amenable to implementation in conjunction with systems having other architectures as well. As another example, the system that has been described has two coherency controllers. However, more or less controllers may also be used to implement a system in accordance with the invention. The coherency unit may also be internal to a processor used in a SMP multiprocessor system. Accordingly, the scope of protection of this invention is limited only by the following claims and their equivalents.

We claim:

1. A method comprising:
    inputting a first transaction into a multiple-stage pipeline to convert the first transaction into a set of concurrently performable actions to process the first transaction;
    after inputting the first transaction into the multiple-stage pipeline, and while converting the first transaction to the set of concurrently performable actions using the multiple-stage pipeline,
        in response to determining, within the multiple-stage pipeline, that the first transaction requires a first memory line that is not currently cached in a cache,
            temporarily storing the first memory line within a data transfer buffer to which the multiple-stage pipeline is directly communicatively connected;

in response to determining, within the multiple-stage pipeline, that a second memory line currently cached in the cache has to be evicted to make room for the first memory line, the first memory line different than the second memory line,
  storing eviction data within the data transfer buffer, the eviction data regarding the second memory line currently cached in the cache;
  spawning an eviction transaction regarding the second memory line, the eviction transaction different than the first transaction;
after the first transaction has been converted to the set of concurrently performable actions using the multiple-stage pipeline,
  performing the set of concurrently performable actions utilizing the first memory line as temporarily stored within the data transfer buffer;
placing the second memory line in an eviction queue, the eviction queue different than the data transfer buffer; and,
after the second memory line has been placed in the eviction queue, inputting the eviction transaction into the multiple-stage pipeline to process eviction of the second memory line.

\* \* \* \* \*

UNITED STATES PATENT AND TRADEMARK OFFICE
CERTIFICATE OF CORRECTION

PATENT NO.       : 7,594,080 B2                                          Page 1 of 1
APPLICATION NO.  : 10/661802
DATED            : September 22, 2009
INVENTOR(S)      : Lovett et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1331 days.

Signed and Sealed this

Twenty-eighth Day of September, 2010

David J. Kappos
*Director of the United States Patent and Trademark Office*